United States Patent
Tokisue et al.

(10) Patent No.: US 6,633,455 B2
(45) Date of Patent: Oct. 14, 2003

(54) SLIDER CAPABLE OF REDUCING DISTANCE BETWEEN HEAD ELEMENT AND RECORDING MEDIUM, AND RECORDING APPARATUS INCORPORATING SAME

(75) Inventors: Hiromitsu Tokisue, Chiyoda (JP); Hiroshi Tani, Ninomiya (JP); Mikio Tokuyama, Tsukuba (JP); Junguo Xu, Chiyoda (JP); Ryuji Tsuchiyama, Matsudo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/781,286

(22) Filed: Feb. 13, 2001

(65) Prior Publication Data

US 2001/0013994 A1 Aug. 16, 2001

(30) Foreign Application Priority Data

Feb. 14, 2000 (JP) ........................................ 2000-039730

(51) Int. Cl.$^7$ ................................................. G11B 5/60
(52) U.S. Cl. ....................................................... 360/236.3
(58) Field of Search ........................... 360/235.4, 235.6, 360/235.7, 235.8, 235.9, 236.6, 236.7, 237, 236.3

(56) References Cited

U.S. PATENT DOCUMENTS 6,246,538 B1 * 6/2001 Kasamatsu et al. ...... 360/235.8
6,424,495 B1 * 7/2002 Kobayashi et al. ...... 360/236.5

* cited by examiner

*Primary Examiner*—George J. Letscher
(74) *Attorney, Agent, or Firm*—Antonelli, Terry, Stout & Kraus, LLP (57) ABSTRACT

A head element is made into contact with the surface of a recording medium so as to realize a float-up degree of 5 nm. Accordingly, a slider incorporating the head element for recording and reproducing data to and from the recording medium is provided thereon with a plurality of pads having step parts, and one of the plurality of pads, on which the head element is mounted, has a height which is less than that of the other pads. Thus, the pads other than the pad on which the head element is mounted are floated up while the pad on which the head element is mounted is stably made into contact with the surface of the recoding medium by means of a meniscus suction force and a damping action of lubricant applied on the surface of the recording medium.

6 Claims, 7 Drawing Sheets

SLIDER CAPABLE OF REDUCING DISTANCE BETWEEN HEAD ELEMENT AND RECORDING MEDIUM, AND RECORDING APPARATUS INCORPORATING SAME

BACKGROUND OF THE INVENTION

The present invention relates to a recording apparatus for recording and reproducing data onto and from a recording medium by means of a head element provided to a slider running on the recording medium, and in particular, to a slider which can reduce the gap between a head element mounted thereon and a recording medium, and to a recording apparatus installed thereon with the slider.

As disclosed in Japanese Laid-Open Patent No. H11-86483 (refer in particular to FIG. 10 of the accompanying drawings), a conventional slider is formed on its air bearing surface with pads having step parts and located at positions in the vicinities of its air inflow end and its air outflow end, respectively, and a step part of the pad formed in the vicinity of the air inflow end is higher than a step part of the pad formed in the vicinity of the air outflow end. An object of this conventional technology is to minimize the scrape-up of lubricant on a magnetic disc, caused by the pads, in order to prevent the frictional force and the adhesion which are effected between the slider and the surface of the magnetic disc, from increasing.

By the way, these days, there has been a greatest demand of increasing the recording density of a recoding apparatuses. In order to increase the recording density, the area of the so-called bit, or the minimum unit area for recording and reproduction should be reduced. Accordingly, it is required to reduce the gap between a head element mounted on a slider, for recording and reproduction, and the surface of a recording medium. It is required to reduce the gap between the head element and the surface of the recoding medium to a value less than 5 nm in order to increase the recording density up to 100 $Gb/in^2$. Accordingly, it is indispensable to materialize a slider which can keep its head element making contact with the surface of the recording medium with no separation therebetween.

However, the above-mentioned conventional slider has a head element which is not provided on the top of a pad but on the air bearing surface thereof, and accordingly, the gap between the head element and the surface of the recording medium cannot be reduced to a value substantially smaller than the height of the pad. Thus, there has been offered such a problem that the head element cannot be made into contact with the surface of the recording medium.

Further, in the above-mentioned conventional slider, a stepped surface which is defined by the step part of the pad, extends in the same direction as that of the surface of the recording medium, that is, it is not opposed to the surface of the recording medium, and accordingly, the pad located in the vicinity of the fluid outflow end, cannot be attracted toward the surface of the recording medium by a meniscus attraction force of lubricant even though the pad has a stepped part having a low height. Accordingly, the top part of the pad jumps on the surface of the recording medium, as a result, there has been such a problem that separation of the head element from the surface of the recording medium cannot be prevented. Further, even a pad located in the vicinity of the inflow end and having a high stepped part cannot be floated up in a non-contact state since action by an air step bearing is present. Thus, there has been also such a problem that a large friction force acting upon the top part of the pad on which the head element is not mounted, and abrasion and damage of the top of the pad cannot be prevented from being caused.

OBJECT AND SUMMARY OF THE INVENTION

The present invention is devised in order to solve at least one of the above-mentioned problem, and accordingly, an object of the present invention is to provide a slider which enables a head element mounted thereon to substantially make contact with a recording medium, and which can stably maintain the contact between the head element and the recording medium. Further, another object of the present invention is to provide a slider which can prevent occurrence of a large friction force between the slider and the surface of a recording medium, and abrasion and damage thereof.

The above-mentioned object can be attained by such an arrangement that a first and a second pad (projection parts) each having a bearing surface as a top surface and a stepped surface defined by a stepped part recessed from the bearing surface, and opposed to the recording medium, are formed on the surface of the slider which is opposed to the recording medium, and a head element is provided to the second pad while the step part on the second pad is lower than that of the stepped part on the first pad.

Detailed Explanation will be hereinbelow made of the present invention in the form of preferred embodiments to which the present invention should not be limited, with reference to the accompanying drawings in which:

DESCRIPTION OF THE PREFERRED EMBODIMENTS

First embodiment of the present invention will be explained with reference to FIGS. 1 to 5. At first referring to FIG. 1 which is a perspective view, there is shown a magnetic disc apparatus as a recording apparatus, for which the present invention is applied.

Figure 1:
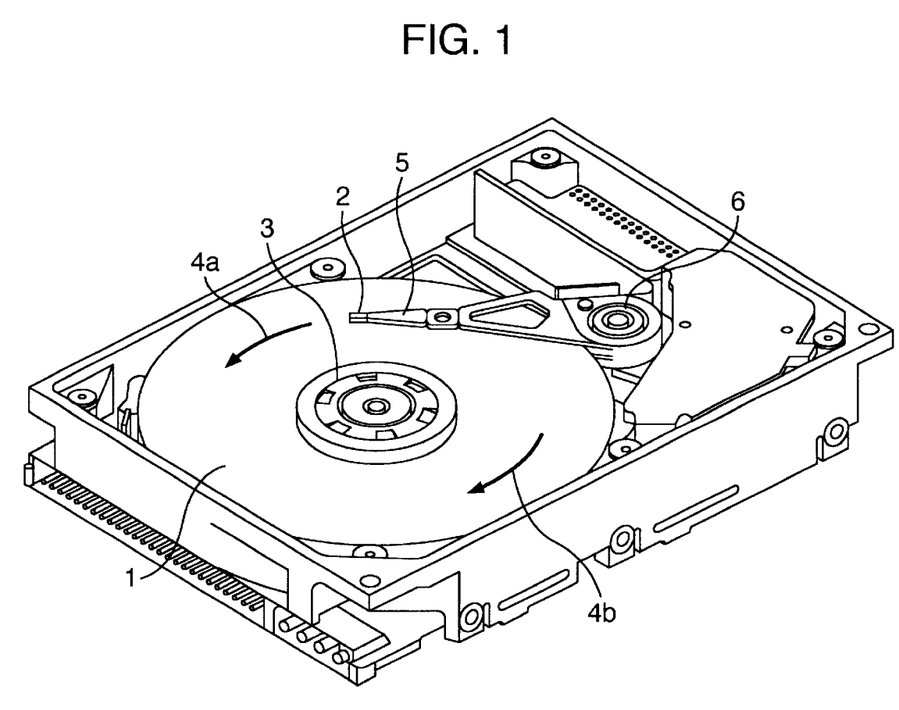
FIG. 1 is a perspective view illustrating an embodiment of the present invention.

A magnetic disc 1 which is a recording medium for recording signals, is fitted on a shaft of a spindle motor 3, and is rotated thereby in a rotating direction indicated by the arrow 4a. A slider 2 which incorporates a head element for recording and reproduction of data, and which is carried by a suspension 5, travels over the surface of the magnetic disc 1 on rotation in a direction substantially radial of the magnetic disc 1, by means of a carriage 6 driven by a voice coil motor. It is noted here that the combination of the suspension 5, the carriage and the voice coil motor will be hereinbelow generally referred as "access means". The present invention relates in particular to the slider 2. By applying the slider according to the present invention in a magnetic disc apparatus, the gap between the head element and the surface of the magnetic disc can be reduced substantially to zero, and further, abrasion and damage to the slider and the magnetic disc can be prevented, thereby it is possible to enhance the durability of the overall magnetic disc apparatus.

It is noted that the rotating direction 4a of the magnetic disc 1 is optional, that is, it may be reverse to the direction indicated by the arrow 4a. That is, in the direction indicated by the arrow 4b, air flow disturbance influencing upon the slider 2 can be reduced.

Figure 2:
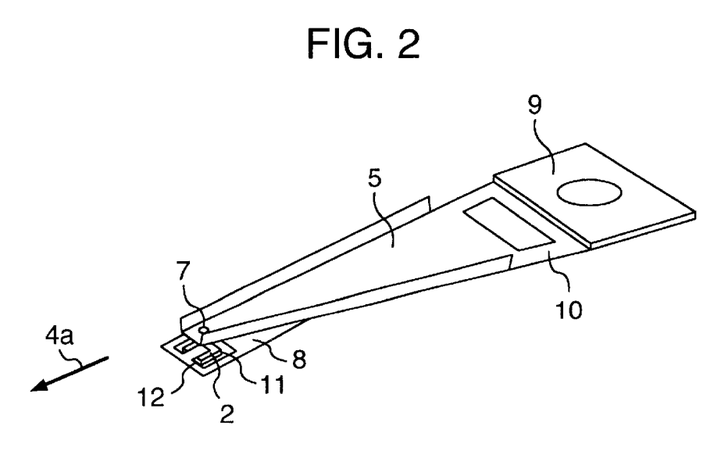
FIG. 2 is a perspective view illustrating an assembly of a slider and a suspension in the first embodiment of the present invention.

Referring to FIG. 2 which is a perspective view illustrating an assembly of the slider 2 and the suspension 5, the suspension 5 is fixed to the carriage 6 by a mount 9 provided to the suspension 5. The suspension 5 is formed with a spring part 10 for applying an urging force to the slider 2, and a pivot protrusion 7 projected toward the surface of the magnetic disc 1. By pressing the pivot protrusion 7 against the rear surface of the slider 7, the urging force by the suspension 5 is applied to the slider 2. Further, the slider 2 is fixed to the suspension 5 through the intermediary of gimbals 8 which is a resilient member formed of a thin flat sheet which is substantially parallel with the surface of the magnetic disc 1, and accordingly, the slider 2 can freely carry out pitching and rolling around a contact point between itself and the pivot protrusion 7 while the slider 2 can be fixed in the in-plane direction of the magnetic disc 1.

In this arrangement, the slider 2 is incorporated with a fluid inflow end 11 on side 5 where the surface of the magnetic disc 1 is approaching, and a fluid outflow end 12 on the side where the magnetic disc 1 is going away in the case of the rotating direction indicated by the arrow 4A.

Figure 3:
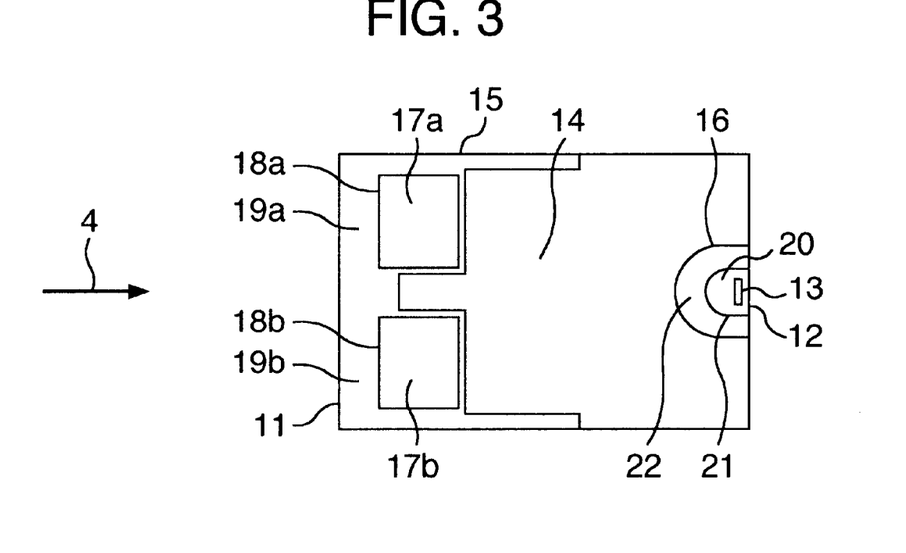
FIG. 3 is a plan view illustrating the surface of a slider in the first embodiment of the present invention, which is opposed to a magnetic disc.
Figure 4:
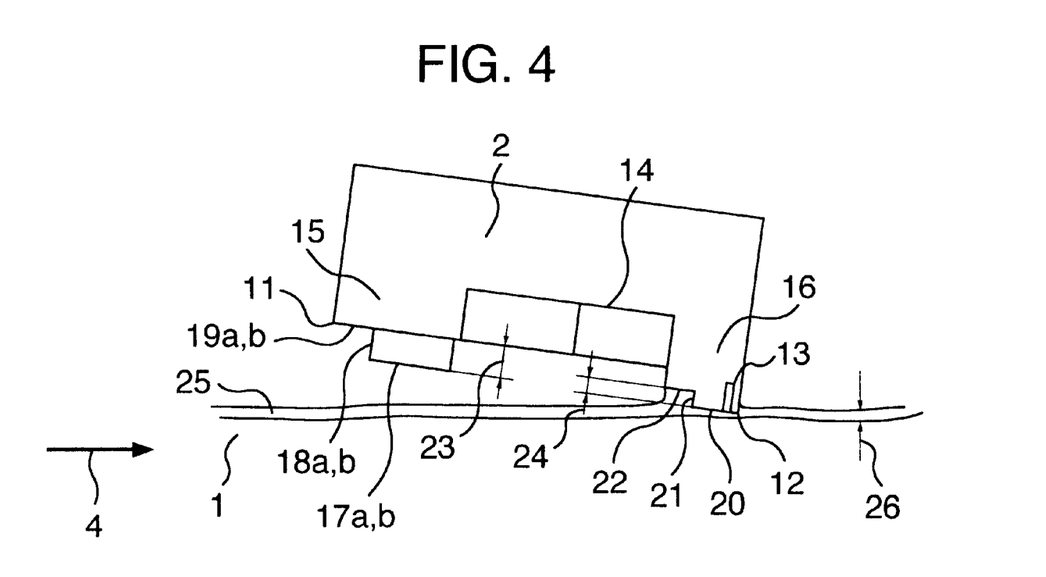
FIG. 4 is a side view illustrating the slider on running in the first embodiment, and the magnetic disc.

The positions of the fluid inflow end 11 and the outflow end 12 are determined by the direction of the relative motion of the surface of the disc 1 and the slider 2, irrespective of the direction of attachment of the slider 2 on the suspension 5. Thus, in the figures in which the slider 2 alone is shown, and in which the slider and the surface of the magnetic disc 1 are shown, the respective rotating directions 4a, 4b with respect to the suspension 5 are not essential, and the direction of motion of the surface of the magnetic disc 1, relative to the slider 2 will be referred simply as the rotating direction 4. FIG. 3 is a plan view illustrating the surface of the slider 2 which is opposed to the magnetic disc 1, and FIG. 4 is a side view illustrating the slider 2 on running and the magnetic disc 1.

The overall length of the slider 2, which corresponds to the distance between the fluid inflow end 11 and the fluid outflow end 12 is set to 1.25 mm, the width of the slider as viewed in a direction orthogonal to the lengthwise direction of the slider 2 is set to 1.0 mm. Further, the thickness of the slider is set to about 0.4 mm. It is noted that the thickness of the slider shown in FIG. 4 is exaggerated so as to be large in comparison with the overall length of the slider as viewed in FIG. 4. A first pad 15 is provided in the vicinity of the fluid inflow end 11 of the slider 2, and a second pad 16 is provided in the vicinity of the fluid outflow end 12 thereof. Two floating bearing surfaces 17a, 17b are formed on the top part of the first pad 15. Floating stepped surfaces 19a, 19b defined by step parts 18a, 18b which are recessed from the floating bearing surfaces 17a, 17b, and opposed to the magnetic disc 1 are formed respectively on the fluid inflow end 11 side of the floating bearing surfaces 17a, 17b. In the embodiment, the height 23 (refer to FIG. 4) of the step parts 18a, 18b is set to about 100 to 200 nm.

Further, the second pad 16 is provided thereto with a head element 13. A contact bearing surface 20 is formed in the top part of the second pad. In this embodiment, the head element 13 is incorporated in the contact bearing surface 20. A meniscus stepped surface 22 is formed around the contact bearing surface 20, being defined by a step part 21 recessed from the contact bearing surface 20, and being opposed to the magnetic disc 1. The height 24 (refer to FIG. 4) of the step part 21 of the second pad 16 is lower than the height 23 of the step part 18a, 18b of the first pad. The difference between these heights is set to a value from about 1 to 50 nm (preferably from about 1 to 25 nm). That is, the height 24 of the step part 21 of the second pad 16 is less than ½ times but greater than 1/200 times as large as the height 23 of the step parts 18a, 18b of the first pad 15. In this embodiment, the height of the floating bearing surfaces 17a, 17b of the first pad is substantially equal to the height of the contact bearing surface 20 of the second pad, being measured from the bleed surface 14 in the second pad 20.

It is noted here that the head element 13 may be provided in the meniscus stepped surface 22, in stead of the contact bearing surface 20, or an arbitrary flat surface recessed from the contact bearing surface 20 in order to adjust the space between the head element 13 and the magnetic disc 1 when the contact bearing surface 20 makes contact with the magnetic disc 1.

In this embodiment, the bleed surface 14 recessed from the floating bearing surfaces 17a, 17b is formed in the first pad 15 on the fluid outflow end 12 side. The recessed depth of the bleed surface 14, 25 measured from the floating bearing surfaces 17a, 17b is set, for example, to about 1 um. With this arrangement, the first pad 15 which is formed in the vicinity of the fluid inflow end 11, being extended over the entire width of the slider 2 serves as a cross rail. Accordingly, when the slider runs on the surface of the disc 1, a negative pressure is effected at the bleed surface 14 which is present on the fluid outflow end 12 side of the first pad 15 serving as the cross rail.

As shown in FIG. 4, the slider 2 runs, with the floating bearing surfaces 17a, 17b of the first pad 15 being floated from the surface of the magnetic disc 1 through the intermediary of an air film while the contact bearing surface 20 of the second pad 16 is substantially made into contact with the magnetic disc. In order to prevent the slider 2 and the magnetic disc 1 from being worn or damaged when they make into contact with each other, the surface of the magnetic disc 1 is coated thereover with a lubricant 25. In this embodiment, for example, perfluoropolyether lubricant may be used as the lubricant 25, and the thickness 26 of the film of this lubricant 25 is about 1 to 2 nm. Accordingly, the height 24 of the step part 21 of the second pad 16 is greater than substantially one time, but less than 5 times as large as the film thickness 26 of the lubricant 25, and preferably, greater than about one time but less than 5 times as large as the film thickness 26 of the lubricant.

Figure 5:
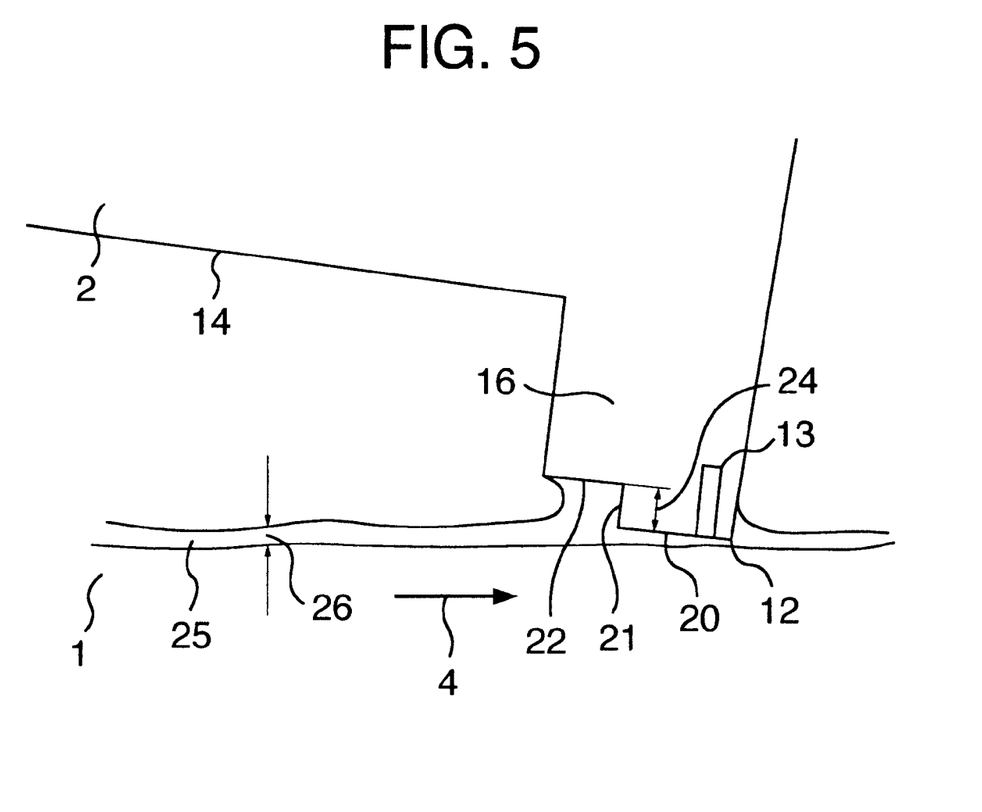
FIG. 5 is an enlarged view illustrating a second pad incorporating a head element, on the slider in the first embodiment of the present invention, and the surface of the magnetic disc.

Referring to FIG. 4 which is an enlarged view of a part of the FIG. 4, illustrating the second pad 16 incorporating the head element 13 and a part of the magnetic disc 1 in the vicinity of the surface thereof, The sum of the area of the contact bearing surface 20 and that of the meniscus stepped surface 22 is greater than about 0.0001 m², but less than about 0.03 mm².

Next, explanation will be made of the operation of the first embodiment of the present invention.

As shown in FIG. 4, the slider 2 runs, with the floating bearing surfaces 17*a*, 17*b* of the first pad 15 being floated from the surface of the magnetic disc 1 through the intermediary of an air film while the contact bearing surface 20 of the second pad 16 is substantially made into contact with the magnetic disc 1. In this embodiment, since the head element 13 is mounted on the contact bearing surface 20 of the second pad 16, the gap between the head element 13 and the magnetic disc 1 can be reduced to a value which is less than the height of the second pad 16. Further, the gap between the head element 13 and the magnetic disc 1 is reduced substantially to zero.

Further, in this embodiment, the height 24 of the step part 21 of the second pad 16 is lower than the height 23 of the step parts 18*a*, 18*b* of the first pad, and accordingly, the height of the step part 21 of the second pad 16 can be set to be greater than about 1 time but less than 10 times as large as the thickness 26 the lubricant 25 on the surface of the magnetic disc 1.

In this arrangement, since the meniscus stepped surface 22 defined by the step part 21 is opposed to the magnetic disc 1, the meniscus of the lubricant 25 is produced between the meniscus stepped surface 22 and the magnetic disc 1. The meniscus stepped surface 22 and the contact bearing surface 20 are attracted toward the surface of the magnetic disc 1 by the suction force of the meniscus. Thus, the suction force of the meniscus allows the contact bearing surface 20 which is the top surface of the second pad 16 to stably make contact with the surface of the magnetic disc 1 without jumping. Accordingly, the head element 13 can be prevented from being separated from the surface of the magnetic disc 1.

As to the range of the height 24 of the step part 21 of the second pad 16, should the height 24 of the step 21 be smaller than the film thickness 26 of the lubricant 25, the meniscus stepped surface 22 would be buried in the layer of the lubricant 25 so that no suction force is produced. On the contrary, should the height 24 of the step part 21 be larger than about 10 times as large as the film thickness 26 of the lubricant 25, the lubricant 25 would not be able to reach the meniscus stepped surface 22 so that no meniscus is created, and accordingly, no suction force is produced. Desirably, as mentioned above, the height 25 of the stepped part 21 is in the range of about 1 to 5 times as larges as the thickness 26 of the lubricant 25.

Further, in this embodiment, since the height of the step parts 18*a*, 18*b* of the first pad 15 is greater than the height 24 of the step part 21 of the second pad 16, the height 23 of the step parts 18*a*, 18*b* of the first pad 15 can be set to a value in a range from about 100 to 200 nm, as mentioned above. With this arrangement, the floating stepped surfaces 19*a*, 19*b* defined by the step parts 18*a*, 18*b* are opposed to the magnetic disc 1, and the surface composed of the floating stepped surfaces 19*a*, 19*b* and the floating bearing surfaces 17*a*, 17*b* in combination serves as a fluid step bearing. For example, if the speed of the surface of the magnetic disc 1, relative to the slider 2 is higher than several m/s, a floating force in the order of several gf can be produced. This floating force allows the first pad 15 to float from the surface of the magnetic disc 1 in a noncontact manner. Thereby it is possible to prevent occurrence of a large friction force acting upon the first pad 15, and abrasion and damage to the top part of the first pad 15.

By preventing occurrence of a large friction force, there may be offered such advantages that the accuracy of radial positioning of the head element 13 by the suspension 5 and the carriage 6 is enhanced, and that the power consumption and heat generation of the spindle 3 can be reduced. The prevention of abrasion and damage can cause the reliability of the magnetic disc apparatus to be greatly enhanced. Since the gap between the head element 13 and the magnetic disc 1 is reduced, there may be optimumly selected such a configuration that the first pad 15 which does not carry the head element, avoids making contact with the magnetic disc 1, rather than the second pad 16 which may inevitably make contact with the magnetic disc 1, as in the present invention.

As to a method of attracting the head element 13 toward the magnetic disc 1 with the use of the meniscus suction force of the lubricant 25, for example, there may be presented such a measure that the height of the pad is lowered in a conventional slider in order to directly effect a meniscus suction force between a recording medium and an air bearing surface. However, in this case, the area of a zone in which a meniscus is produced on the air bearing surface cannot be controlled. Accordingly, the meniscus suction force substantially proportional to the area of the meniscus zone cannot be adjusted. Thus, abrasion of the top part of the pad, caused by an excessive suction force, and occurrence of jumping caused by a very small suction force, can not be prevented.

On the contrary, in this embodiment, the zone where the meniscus is produced, is limited to the meniscus stepped surface 22 and the contact bearing surface 20 adjacent to the meniscus stepped surface 22. Accordingly, the sum of the area of the meniscus stepped surface 22 of the second pad and the area of the contact bearing surface 20, and the height of the step part 21 of the second pad are adjusted so as to regulate the meniscus suction force. Accordingly, there can be prevented abrasion of the top part of the pad caused by an excessive suction force, and occurrence of jumping caused by a very small suction force.

It is noted, estimation can be made such that the angle of contact of the lubricant 25 with respect to the surface of the second pad 16 and the surface of the magnetic disc 1 is substantially zero. Thus, the meniscus force Fm by which the second pad 16 is attracted toward the magnetic disc 1 can be exhibited by the following formula:

$$Fm(2A\gamma)/h \qquad (1)$$

where A is the sum of the area of the meniscus stepped surface 22 and that of the contact bearing surface 20, γ is the surface energy of the lubricant 25, and h is the height 24 of the step part 21.

By using the formula, consideration will be hereinbelow made of practical upper and lower limits of the value A which is the sum of the area of the meniscus stepped surface 22 of the second pad 16 and the area of the contact bearing surface 20. If the above-mentioned perfluoropolyether lubricant is used as the lubricant 25, the surface energy γ thereof is 0.25 N/m. First, as to the upper limit, since it is not required that Fm exceeds the present slider load of about 0.03 N (about 3 gf), the upper limit value of A becomes 0.3 mmm$^2$ due to that the upper limit value of h is 50 nm. Next, as to the lower limit value, if the required minimum value of Fm is set to 0.005 N (about 0.5 gf), and if the lower limit value of h is set to 1 nm, A becomes 0.0001 mm$^2$. That is, the sum of the area of the meniscus stepped surface 22 and the area of the contact bearing surface 20 is in the range from about 0.0001 mm$^2$ to 0.03 mm$^2$.

Further, in order to prevent abrasion and damage to the front end of the pad, it is inevitable to prevent the lubricant on the contact surface from being depleted. However, since a conventional slider is formed with a step part between a thin proximal end part and a thick distal end part of a pad, the pad scraps up the lubricant so that the lubricant is not held at the front end part of the pad. Accordingly, depletion of the lubricant on the top part of the pad continuously making contact with a recording medium cannot be prevented, and thus, there has been caused such a problem that the top part of the pad and the surface of the recording medium cannot be prevented from being worn.

On the contrary, in this embodiment, a meniscus is created between the meniscus stepped surface 22 of the second pad 16 and the surface of the magnetic disc 1, and accordingly, the lubricant 25 can be held at the front end part of the second pad 16. Accordingly, it is possible to prevent the lubricant 25 fed on the contact bearing surface 20 which makes contact with the magnetic disc 1 in a substantially continuous manner, from being depleted, and it is also possible to prevent the contact bearing surface 20 of the second pad 16 and the magnetic disc 1 from being worn due to depletion of the lubricant.

It is noted that, according to the present invention, the pad of the two stage step slider, which is provided thereto with the head element, has a height measured from the first stage bleed surface, higher than that of the first stage of the pad which is not provided thereto with the head element, so as to reduce the height of the step on the head element side. In addition, by setting the height of the first stage measured from the bleed surface to be equal to that of the first stage of the pad so as to reduce the height of the second stage only on the side where the head element is provided, the same effects can be obtained. Further, in addition to the configuration of the two stage step slider, even such a configuration that the height of a floating pad provided thereon with a head element, measured from the bleed surface may be reduced.

Figure 6A:
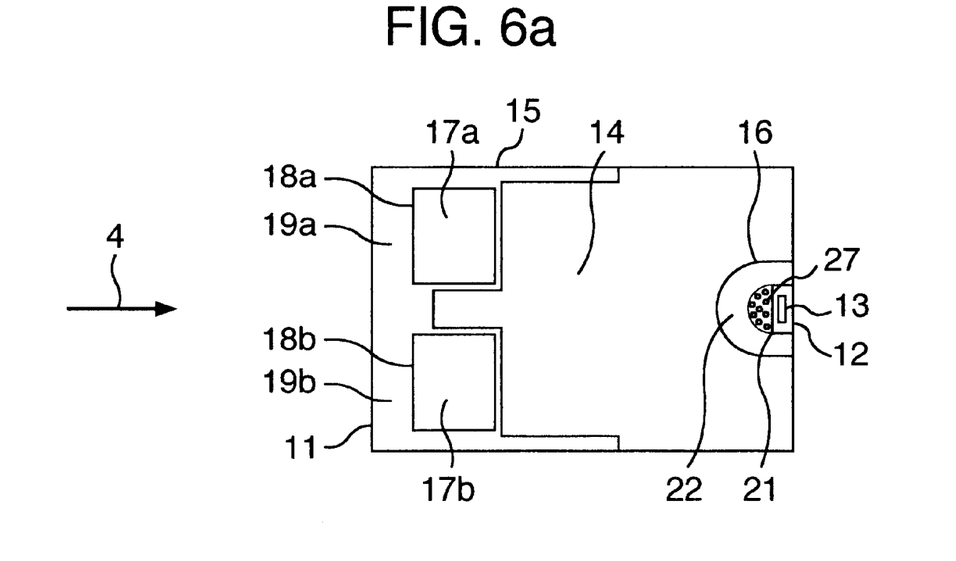
FIG. 6a is a plan view illustrating the surface of the slider which is opposed to the surface of a magnetic disc in a second embodiment of the present invention.
Figure 6B:
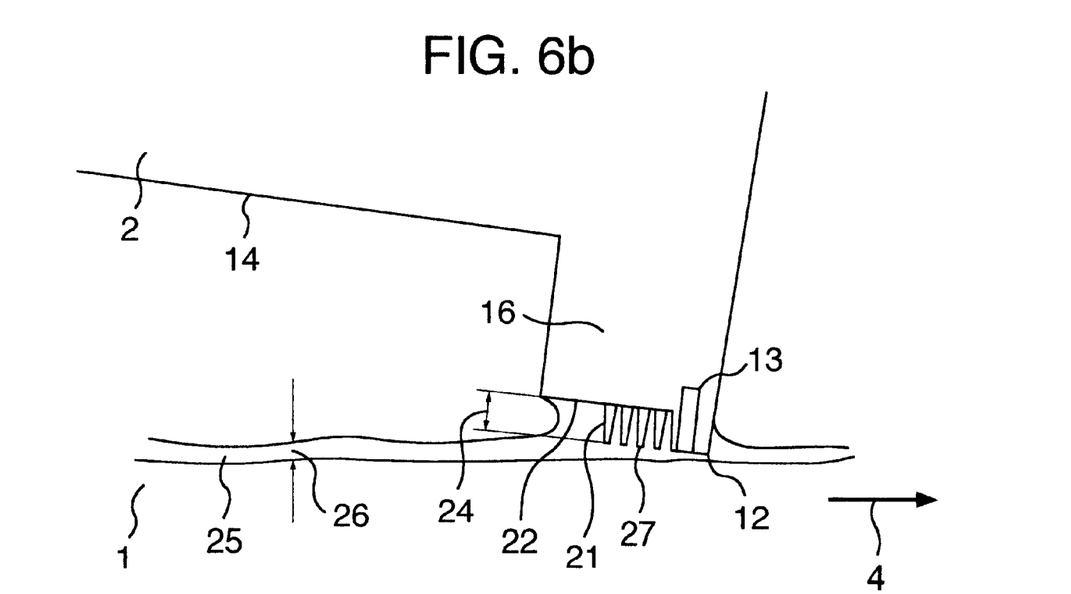
FIG. 6b is an enlarge view illustrating a second pad incorporating a head element, on the slider in the second embodiment of the present invention, and the surface of the magnetic disc.

Next, explanation will be hereinbelow made of a second embodiment of the present invention with reference to FIG. 6a which is a plan view illustrating the surface of a slide in the second embodiment, which is opposed to the magnetic disc 1, and FIG. 6b is an enlarged view illustrating a part of the slider 2 in the second embodiment, and in which the second pad 16 incorporating the head element 13 and a part of the magnetic disc 1 in the vicinity of the surface thereof are shown. As shown in this figure, the contact bearing surface of the second pad 16 is defined by top surfaces 27 of a plurality of protrusions.

In this embodiment, since caves are present closely adjacent to the top surfaces 27 of the protrusions, which make contact with the magnetic disc 1, even through the lubricant 25 at the top surfaces 27 of the protrusions decreases through contacting and sliding, the lubricant 25 present in the caves closely adjacent to the top surfaces 27 of the protrusions can soon compensate for the decrease of the lubricant 25 at the top surfaces 27 of the protrusions. Accordingly, it is possible to prevent the top surfaces 27 of the protrusions and the magnetic disc 1 from being worn due to depletion of the lubricant 25 at the top surfaces 27 of the protrusions.

Figure 7A:
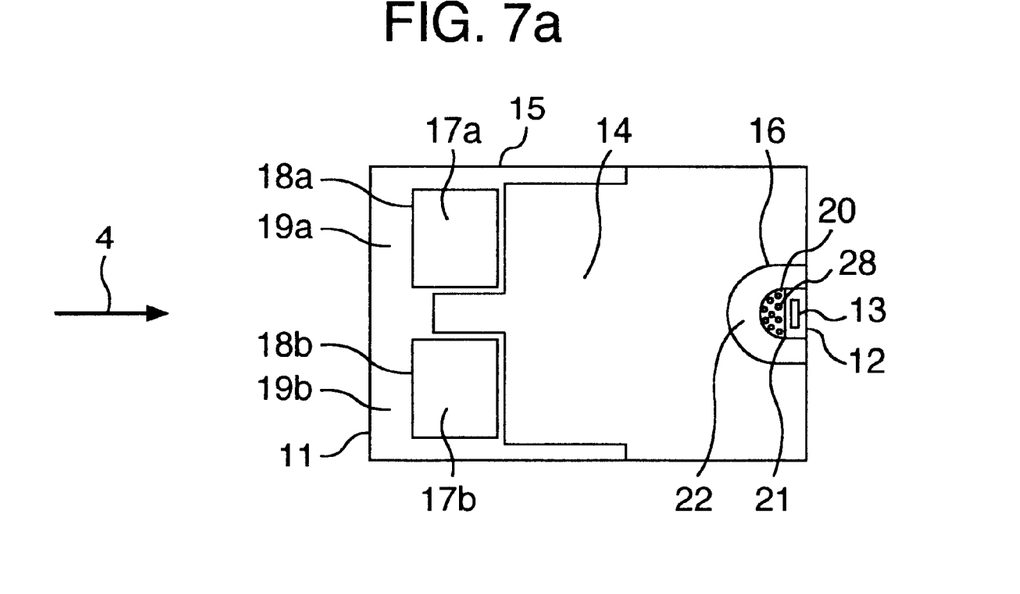
FIG. 7a is a plan view illustrating a slider in a third embodiment of the present invention.
Figure 7B:
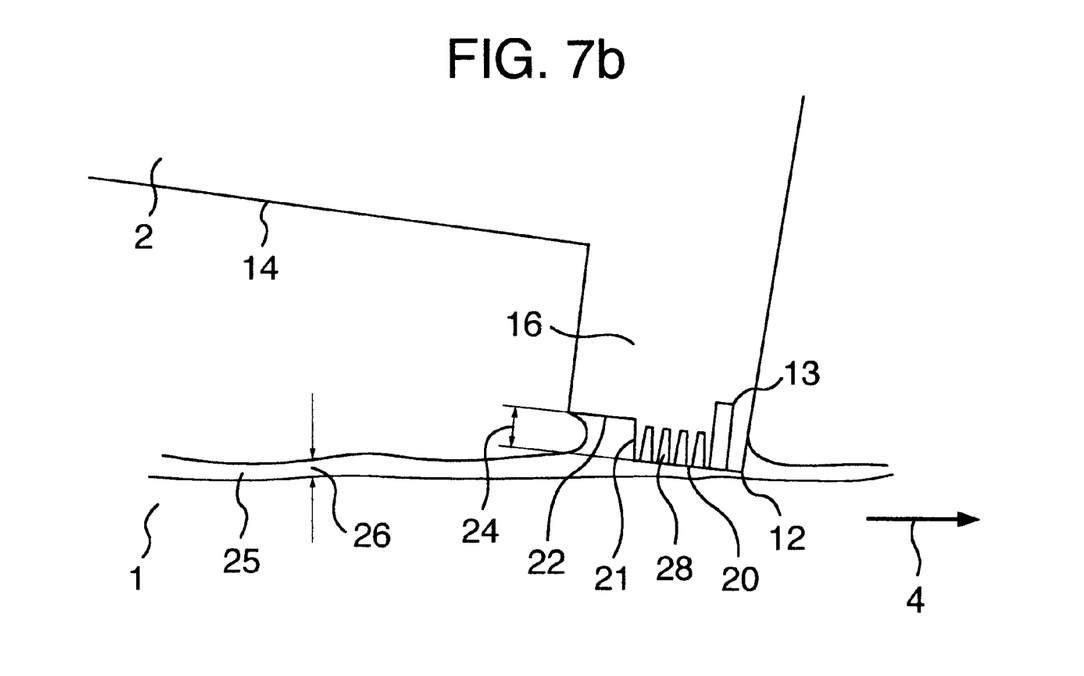
FIG. 7b is an enlarged view illustrating a second pad incorporating a head element, on the slider in the first embodiment of the present invention, and the surface of the magnetic disc.

Next, explanation will be made of a third embodiment of the present invention with reference to FIG. 7a which is a plan view illustrating a slider 2 in this embodiment, and FIG. 7b which is an enlarged view illustrating the second pad 16 incorporating the head element 13, and a part of the magnetic disc 1 in the vicinity of the surface thereof. As shown in these figures, a plurality of caves 28 are formed in the contact bearing surface 20 of the second pad 16.

In this embodiment, similar to the second embodiment, since there are presented the caves closely adjacent to the contact part of the contact bearing surface 20 with respect to the magnetic disc 2, it is possible to prevent the bearing surface 20 and the magnetic disc 1 from being worn due to depletion of the lubricant 25 on the contact bearing surface 20.

Figure 8:
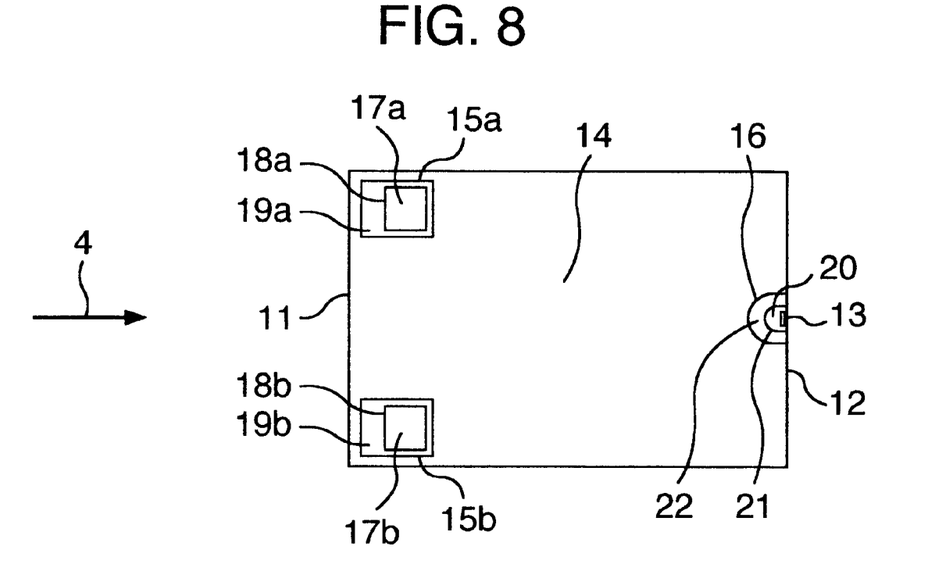
FIG. 8 is a plan view illustrating the surface of a slider in a fourth embodiment of the present invention, which is opposed to a magnetic disc.

Next, explanation will be made of a fourth embodiment with reference to FIG. 8 which is a plan view illustrating the surface of a slider 2 in this embodiment, which is opposed to the magnetic disc 1. As shown in this figure, The bleed surface 14 is formed extending from the fluid inflow end 11 to the fluid outflow end 12, being substantially planar with no part corresponding to the cross rail.

In this embodiment, since no cross rail is present, substantially no negative pressure is present on the bleed surface 14. Accordingly, even though the radial position of the slider 2 is changed in response to motion of the carriage 6 so as to change the speed of the magnetic disc 1, relative to the slider 2, it is possible to prevent the force caused by the fluid dynamic pressure acting upon the second pad 16, from varying. Accordingly, the contact force between the second pad 16 and the magnetic disc can be maintained to be substantially constant.

Figure 9:
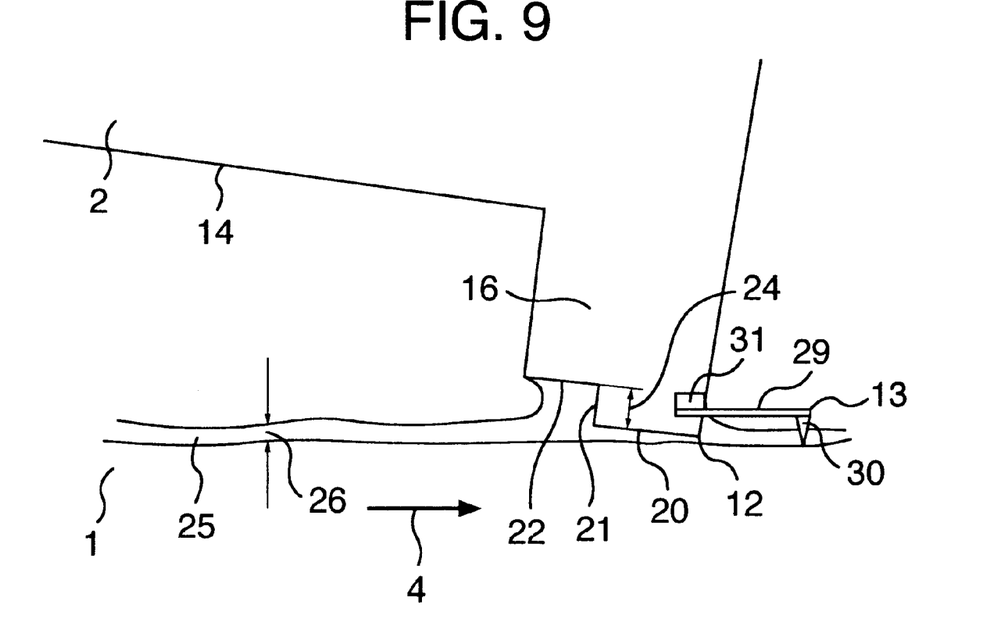
FIG. 9 is an enlarged view illustrating a second pad incorporating a head element, on a slider in a fifth embodiment of the present invention, and a surface of a magnetic disc.

Next, explanation will be made of a fifth embodiment of the present invention with reference to FIG. 9 which is an enlarged view illustrating a second pad 16 incorporating a head element 13 on a slider 2 in the fifth embodiment of the present invention, and a part of a magnetic disc 1 in the vicinity of the surface thereof. As shown, the head element 13 is composed of a cantilever 29, a probe chip 30 incorporated to the distal end of the cantilever and a sensor actuator 31 for moving the cantilever in a direction substantially perpendicular to the surface of the magnetic disc 1 while monitoring the motion thereof. This configuration is substantially the same as that of the cantilever part of an AFM (atomic force microscopy). Further, the surface of the disc as a recording medium is plastic.

In the case of recording data on the recording medium 1, the probe chip 30 is pressed against the surface of the recording medium 1 so as to form a pit in the recording medium. At this stage, if the probe chip 30 is heated, the formation of the cave can be facilitated. In order to read data recorded on the surface of the recording medium 1, the probe chip 30 is made into contact with the surface of the recording medium while it is moved along the direction along the running direction of the slider 2. At this time, by monitoring the motion of the probe chip 30 in the direction perpendicular to the surface of the recording medium 1 by means of the sensor actuator 31, the in the recording medium 1 is read.

In this embodiment, since the same spatial resolution as that of AMF which can observe an atomic image, can be materialized, the recording density can be increased to about 300 Gb/in² which is about 30 times as high as the recording density at present.

In addition to this AMF type head element, there may be a system having an extremely small electrode as a head element, for recording and reproducing charges onto and from a recording medium having a surface made of Nitride-oxide-silicon, and a system having a STM (Scanning tunneling microscopy) probe as a head element, for recording and reproducing structural variation onto and from a recording medium.

Figure 10:
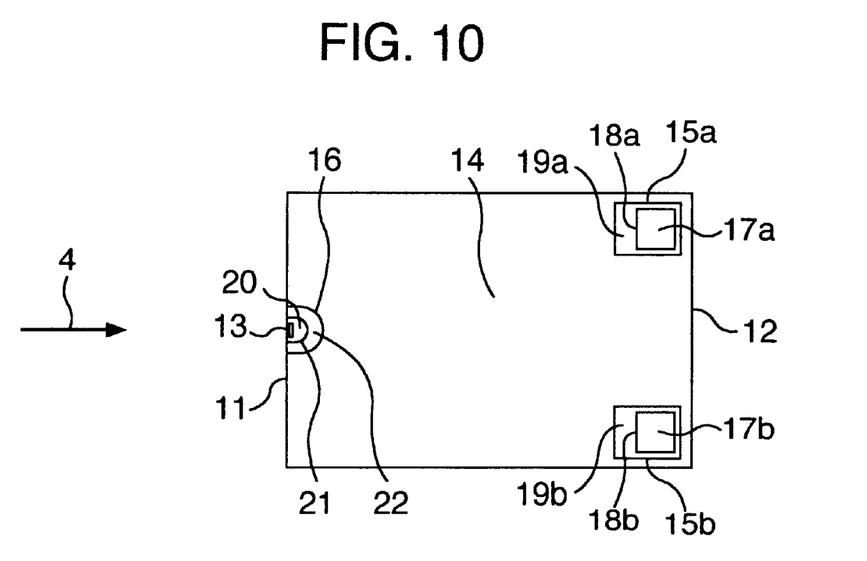
FIG. 10 is an enlarged view illustrating the surface of a slider in a sixth embodiment of the present invention, which is opposed to a magnetic disc.
Figure 11:
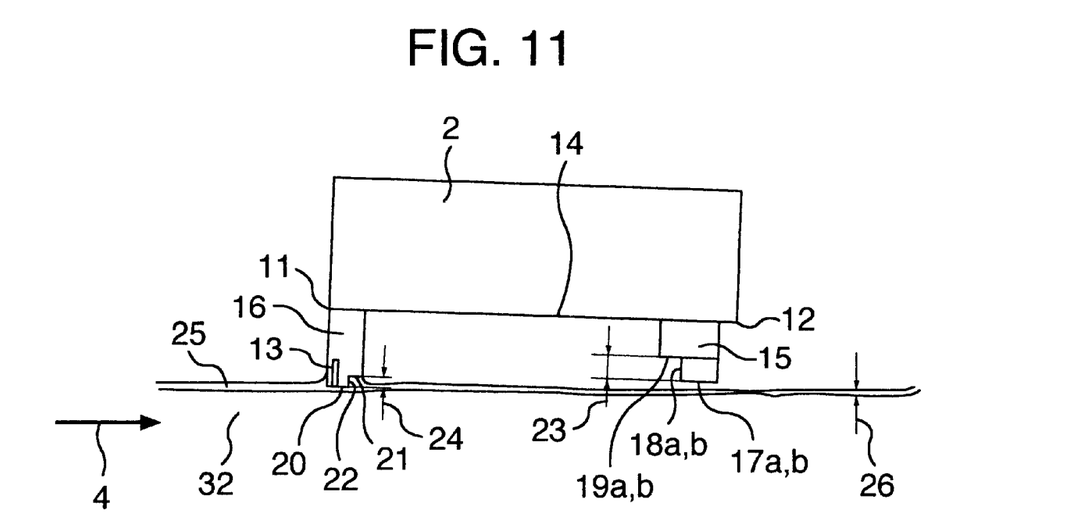
FIG. 11 is a side view illustrating the slider on running in the sixth embodiment, and a magnetic disc.

Next, Explanation will be made of a sixth embodiment of the present invention with reference to FIGS. 10 and 11. FIG. 10 is a plan view illustrating the surface of the slider 2 which is opposed to the magnetic disc 1, and FIG. 11 is a side view illustrating the slider 2 on running and the magnetic disc 1. As shown, the second pad 16 on which the head element 13 is mounted is provided in the vicinity of the fluid inflow end 11.

In this embodiment, a frictional force acting upon the second pad 16 causes a moment by which the fluid inflow end 11 approaches the magnetic disc 1, and accordingly, the head element 13 is surely prevented from going away from the surface of the magnetic disc 1.

It is manifest from the above-mentioned mentioned explanation that there can be provided, according to the present invention, a slider and a recording apparatus incorporating the slide, which can substantially make a head element mounted on the slider into contact with a recording medium, which can stably keep such a contact, and which can prevent the slider and the surface of the recording medium from being exerted thereto with a large frictional force and from being worn and damaged.

What is claimed is:

1. A slider incorporating a head element for recording and reproducing data to and from a recording medium, the slider having an inflow end and an outflow end, where the slider has first and second pads provided with bearing surfaces defining top surfaces, and stepped surfaces formed by step parts which are recessed from the bearing surface and opposed to a recording medium, the first pad being located in a vicinity of the inflow end and the second pad being located in a vicinity of the outflow end with a bleed surface being extended therebetween, and the second pad is provided therein with a head element, the step part of the second pad having a height which is lower than that of the step part of the first pad.

2. A slider as set forth in claim 1, where the height of the step part of the second pad is less than ½ times, but larger than ¹⁄₂₀₀ times as large as, the height of the step part of the first pad.

3. A slider as set forth in claim 1, where the bearing surface of the second pad is composed of top surfaces of a plurality of protrusions.

4. A slider as set forth in claim 1, where a plurality of caves are formed in the bearing surface of the second pad.

5. A recording apparatus comprising a recording medium rotatably mounted on a spindle, a slider incorporating a magnetic head element for recording and reproducing data to and from the recording medium, the slider having an inflow end and an outflow end, and an access means for moving the slider over a surface of the recording medium, a plurality of pads having two-stage step parts incorporated into one side of the slider, and the magnetic head element provided on one pad of the plurality of pads, the one pad having the head element being located in a vicinity of the outflow end, and at least one different pad of the plurality of pads being located in a vicinity of the inflow end, and wherein a medium-opposing-step stage of the one pad on which the head element is provided has a step height measured from the pad surface which is shorter than a step height of a medium-opposing-step stage of the at least one different pad.

6. A recording apparatus as set forth in claim 5, wherein a lubricant layer of a thickness is formed on a surface of the recording medium, and the step part of the one pad on which the head element is provided has a height which is greater than about 1 time, but less than 10 times, as large as the thickness of the lubricant layer.

* * * * *